United States Patent [19]
Henson

[11] Patent Number: 5,408,894
[45] Date of Patent: Apr. 25, 1995

[54] APPARATUS FOR MOUNTING AN OBJECT OF INTEREST ON AN ELECTRIC MOTOR

[76] Inventor: Keith S. Henson, 2931 S. 55th St., Milwaukee, Wis. 53219

[21] Appl. No.: 28,409

[22] Filed: Mar. 9, 1993

[51] Int. Cl.[6] ............................................. G01D 21/00
[52] U.S. Cl. ........................................ 73/866.5; 73/116
[58] Field of Search .................... 73/116, 112, 119 A, 73/119 R, 855, 856, 866.5

[56] References Cited

U.S. PATENT DOCUMENTS

| | | | |
|---|---|---|---|
| 2,579,804 | 12/1991 | Dotson | 73/116 |
| 3,505,863 | 4/1970 | Lucia | 73/116 |
| 3,898,875 | 8/1975 | Knoop et al. | 73/116 |
| 4,694,688 | 9/1987 | Takahashi et al. | 73/116 |
| 4,779,454 | 10/1988 | Fitzner et al. | 73/116 |
| 4,823,602 | 4/1989 | Christensen, Jr. | 73/866.5 |
| 4,903,525 | 2/1990 | Chiba et al. | 73/116 |
| 4,922,749 | 5/1990 | Steffes et al. | 73/116 |
| 5,018,397 | 5/1991 | Matich | 73/866.5 |

OTHER PUBLICATIONS

C-TAC Inverter Duty Motors Advertisements by Marathon Electric.

*Primary Examiner*—Richard E. Chilcot, Jr.
*Assistant Examiner*—James M. Olsen
*Attorney, Agent, or Firm*—Godfrey & Kahn

[57] ABSTRACT

An apparatus for mounting an object of interest in coaxial alignment relative to a rotatable shaft including a coupler having a post; a housing for rotatably supporting the coupler; and a sensor borne by the housing and is posed in sensing relation relative to the post.

8 Claims, 3 Drawing Sheets

APPARATUS FOR MOUNTING AN OBJECT OF INTEREST ON AN ELECTRIC MOTOR

SPECIFICATION

1. Field of the Invention

The present invention relates to an apparatus for mounting an object of interest on an electric motor and more particularly, to such an apparatus which is operable to mount a sensor in substantially coaxial alignment relative to the rotatable shaft of the motor, the sensor providing information regarding the speed; direction of rotation; or position of the rotatable shaft, while simultaneously providing a convenient and cost-effective means for mounting sensors on assorted motors of various sizes without substantial alteration of same or retrofitting existing motors without removing the motor from an existing machine.

2. Description of the Prior Art

The prior art is replete with numerous examples of various electric motor designs which are utilized in various industrial machinery and other processes. As a general matter, the National Electric Manufacturer's Association (NEMA) recognizes five types of motors which are classified according to their ability to vary their speed of operation. This classification includes motors which are classified as constant speed motors, that is, motors which have a normal operating speed which is constant or practically constant. For example, synchronous motors, induction motors with a small amount of slip or direct current shunt wound motors are examples of constant speed motors. The second category in this classification includes varying-speed motors. In this type of motor, the speed varies with the load and ordinarily decreases when the load increases. Examples of these motors include series-wound and repulsion motors. The third category in this classification includes adjustable-speed motors. In this type of motor, the speed can be varied gradually over a considerable range, but when it is adjusted, it remains practically unaffected by the load. Examples of these motors include direct-current shunt-wound motors with field resistance controls designed for a considerable range of speed adjustment. As a general matter, for adjustable speed motors, the base speed is the lowest rated speed obtained at a rated load and rated voltage at the temperature rise specified in the rating. The fourth category in this classification includes adjustable varying-speed motors. This type of motor is one in which the speed can be adjusted gradually, but when once adjusted for a given load, will vary a considerable degree with the change in the load. Examples of these motors include direct-current compound wound motors adjusted by a field control or a wound-rotor induction motor with rheostatic speed controls. The fifth category in this classification includes multispeed motors. These types of motors are ones which can be operated at any one of two or more definite speeds, each being practically independent of the load. Examples of these motors include a direct-current motors with two armature windings or induction motors with windings capable of various pole groupings. In the case of a multi-speed permanent-split capacitor and shaded pole motors, the speeds are dependent upon the load.

Numerous factors govern the types of motors selected for a particular industrial application. As a general matter, the four requirements that are normally considered in selecting a motor include speed, horsepower, torque, and inertia. For example, and where more than one speed or a range of speeds are called for, any one of a number of different motors may be selected depending on their requirements. For example, in direct current applications, a standard shunt-wound motor with a field control normally has a 2 to 1 range. Further, an adjustable speed motor may have a range of from 3 to 1 up to 6 to 1. Additionally, shunt motors with adjustable voltage supplies have a range of up to 20 to 1, or more, below base speed and 4 or 5 to 1 above base speed making a total range of up to 100 to 1 or more. In considering horsepower, where the load to be carried by the motor is not constant but follows a definite cycle, a horsepower-time curve enables a peak horsepower to be determined as well as the root-mean-square average horsepower which indicates the proper motor rating from a heating standpoint. Where the operations of the machine used may be at several speeds, the horsepower requirement for each speed should be considered. When considering torque, torque requirements may vary from as little as 10% of full load to 250% of full load torque, depending upon the type of machine being driven. Starting torque may vary for a given machine because of the frequency of start, temperature, and the types and amount of lubricants employed. Normally, the motor torque supplied to the machine must be well above that required by the driven machine and all points up to full speed. As a general matter, the peak horsepower determines the maximum torque required by the driven machine, and the motor must have a maximum running torque in excess of this value. Finally, inertia must be considered. Inertia, or what has been termed the flywheel effect of the rotating parts of a driven machine will, if exceedingly large, appreciably affect the accelerating time and hence the amount of heating in the motor. For specific motor designs such as synchronous motors, the inertia of both the motor rotor and rotating parts of the machine must be known since the pull-in torque, that is, the torque required to bring the driven machine up to synchronous speed varies approximately as the square root of the total inertia of the motor and the load.

Various devices have been developed and been employed for altering the performance characteristic of electric motors. For example, in the case of induction motors, speed control can be obtained by various methods. For example, speed control may be attained by utilizing frequency control, that is, the frequency of the power supply is varied by means of another assembly. When utilizing this method, these devices alter the synchronous speed of the revolving magnetic field thereby increasing or decreasing the speed of the motor. Another method used for changing the speed of induction motors includes pole changing, that is, altering the number of effective poles by regrouping the stator coils. This method enables the speed to be changed in a stepwise or in fixed ratio fashion. Another method used for obtaining speed control in induction motors includes the addition of a rotor or secondary resistance. This is frequently termed a slip-ring induction motor. Finally, speed control of induction motors may be achieved through the use of a stator control.

In various manufacturing environments, it is often necessary to coordinate the actions of various electric motors in the operation of various subassemblies.

In this regard, it is often necessary that sensors be mounted in sensing relation relative to a motor to provide data relative to the speed; direction of rotation; or position of the rotatable motor shaft in order to achieve various ends. For example, sensors such as resolvers, encoders, tachometers, and similar devices have been mounted on electric motors to achieve various beneficial results. However, the means for mounting these devices on electric motors have been less than satisfactory. For example, many of the arrangements have been peculiarly adapted for specific motor designs, or specific ratings, such as horsepower. These have made these specific arrangements inappropriate for smaller motor sizes, or in that instance, in arrangements where the motors may be used in specific industrial applications.

Further, and while the prior art references and practices have operated with varying degrees of success, they have been unsatisfactory in several respects. For example, the prior art devices and practices are sometimes cumbersome to utilize and frequently require substantial alteration of the motor in order to render the associated sensor operable. Additionally, such devices may be expensive to manufacture and also time-consuming to repair or maintain.

Still, another deficiency with the prior art devices and practices results from characteristics inherent in their individual designs. For example, many of the prior art assemblies, as noted above, may be difficult to adjust or repair or further, are incapable of being utilized except within a very specific range of motor sizes.

Therefore, it has long been known that it would be desirable to have an apparatus for mounting an object of interest such as a sensor in sensing relation relative to the rotatable shaft of an electric motor and which is operable to position the sensor to provide information relative to the performance of the motor, and which further is operable to reduce the time and labor required to install, and later maintain such devices, with the attendant economic savings realized from such reductions.

OBJECTS AND SUMMARY OF THE INVENTION

Therefore, it is an object of the present invention to provide an improved apparatus for mounting an object of interest in substantial coaxial alignment relative to a rotatable shaft.

Another object of the present invention is to provide such an apparatus which has particular utility in mounting a sensor, such as a resolver; encoder; or tachometer and other similar assemblies in sensing relation relative to the rotatable shaft of an electric motor.

Another object of the present invention is to provide such an apparatus which includes a coupler for releasably engaging the rotatable shaft, and wherein the coupler has an exterior facing surface and a post, and wherein the post is substantially coaxially aligned relative to the rotatable shaft.

Another object of the present invention is to provide an apparatus which includes a housing for rotatably supporting the coupler in substantially coaxial alignment relative to the rotatable shaft, and wherein the housing defines an aperture which is substantially aligned with the post, and wherein the post extends outwardly through the aperture, and a sensor is borne by the housing and disposed in sensing relation relative to the post.

Another object of the present invention is to provide an apparatus wherein a mounting bracket is fixed on the motor and is further fixed on the housing, and wherein the mounting bracket positions the housing in telescoping relation relative to the rotatable shaft.

Another object of the present invention is to provide such an apparatus wherein the coupler has a substantially cylindrically shaped main body having a predetermined outside diametral dimension, and wherein the coupler further has an inside facing surface which defines a predetermined inside diametral dimension, and wherein the inside diametral dimension of the coupler may be varied thereby allowing the coupler to accommodate the rotatable shafts of electric motors having various outside diametral dimensions.

Another object of the present invention is to provide an apparatus wherein the coupler has a threaded passageway formed therein, and wherein a threaded fastener is received in the passageway and is operable to be threadably advanced to a position wherein it forcibly engages the rotatable shaft of the motor thereby rendering the coupler rotatable therewith.

Another object of the present invention is to provide an apparatus and wherein the housing has a passageway formed therein and wherein the passageway, when disposed in substantial alignment with the passageway formed in the coupler permits a suitable tool to be moved through the coaxial aligned passageways thereby permitting the threaded fastener to be advanced into and out of forcible engagement with the rotatable shaft of the electric motor.

Another object of the present invention is to provide such an apparatus which is easy to operate and adjust and which further is easily accessed for purposes of maintenance, modification and the like.

Another object of the present invention is to provide such an apparatus which is characterized by ease of utilization, simplicity of construction, and which further can be manufactured, sold, and maintained at a relatively nominal cost.

These and other objects and advantages are achieved in an apparatus for mounting an object of interest in substantially coaxial alignment relative to a rotatable shaft, the apparatus including a coupler for releasably engaging the rotatable shaft, the coupler having an exterior facing surface and a post, and wherein the post is substantially coaxially aligned with the rotatable shaft; a housing for rotatably supporting the coupler in substantially coaxial alignment relative to the rotatable shaft, and wherein the housing defines an aperture which is substantially aligned with the post, and wherein the post extends outwardly through the aperture; and a sensor borne by the housing and disposed in sensing relation relative to the post.

DESCRIPTION OF THE PREFERRED EMBODIMENT

Referring more particularly to the drawings, the apparatus for mounting an object of interest on an electric motor is generally indicated by the numeral 10 in FIG.

Figure 3:
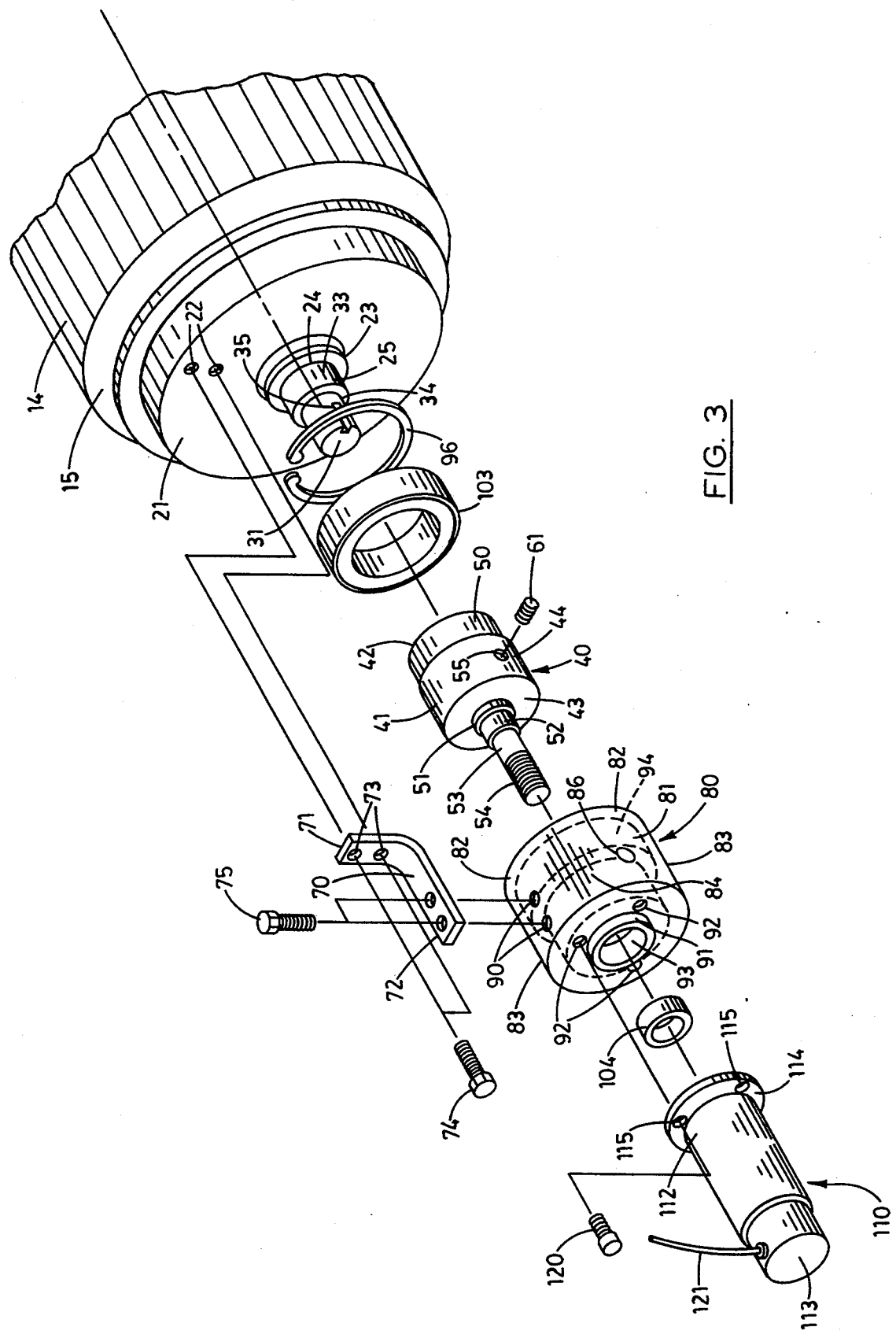
FIG. 3 is a fragmentary, perspective, exploded view of the apparatus of the present invention shown in FIG. 1.

1. For illustrative convenience, the apparatus 10 is herein shown and described as would be configured if it were manufactured for purposes of being mounted on an electric motor of conventional design. The electric motor 11 has a base, or foot 12 which is mounted on a supporting surface, not shown. The base or foot has apertures 13 formed therein which individually accommodate threaded fasteners, not shown. Mounted directly on the base or foot 12 is a housing or frame for the motor 14. The housing is of conventional design and therefore is not discussed in significant detail herein. The housing has a first or front end 15, and an opposite second or drive end 20. Further, and as best illustrated in FIG. 3, the first end has an outwardly facing surface 21 which has a pair of apertures 22 formed therein. The first end further defines a collar 23, and also defines an aperture 24. The aperture rotatably receives a rotatable shaft 25 of conventional design. The shaft 25 is supported in the aperture 24 by bearings, not shown. The rotatable shaft 25 is defined by a longitudinal line of reference 30. Further, the shaft has a first end 31 and an opposite second end 32. As best seen by reference to FIG. 3, the first end 24 of the rotatable shaft 25 has a first portion 33 which has a predetermined outside diametral dimension, and a second portion 34 which has a reduced outside diametral dimension in relative comparison to the first portion. As best seen in FIG. 3, a keyway 35 is formed in the second portion.

Figure 2:
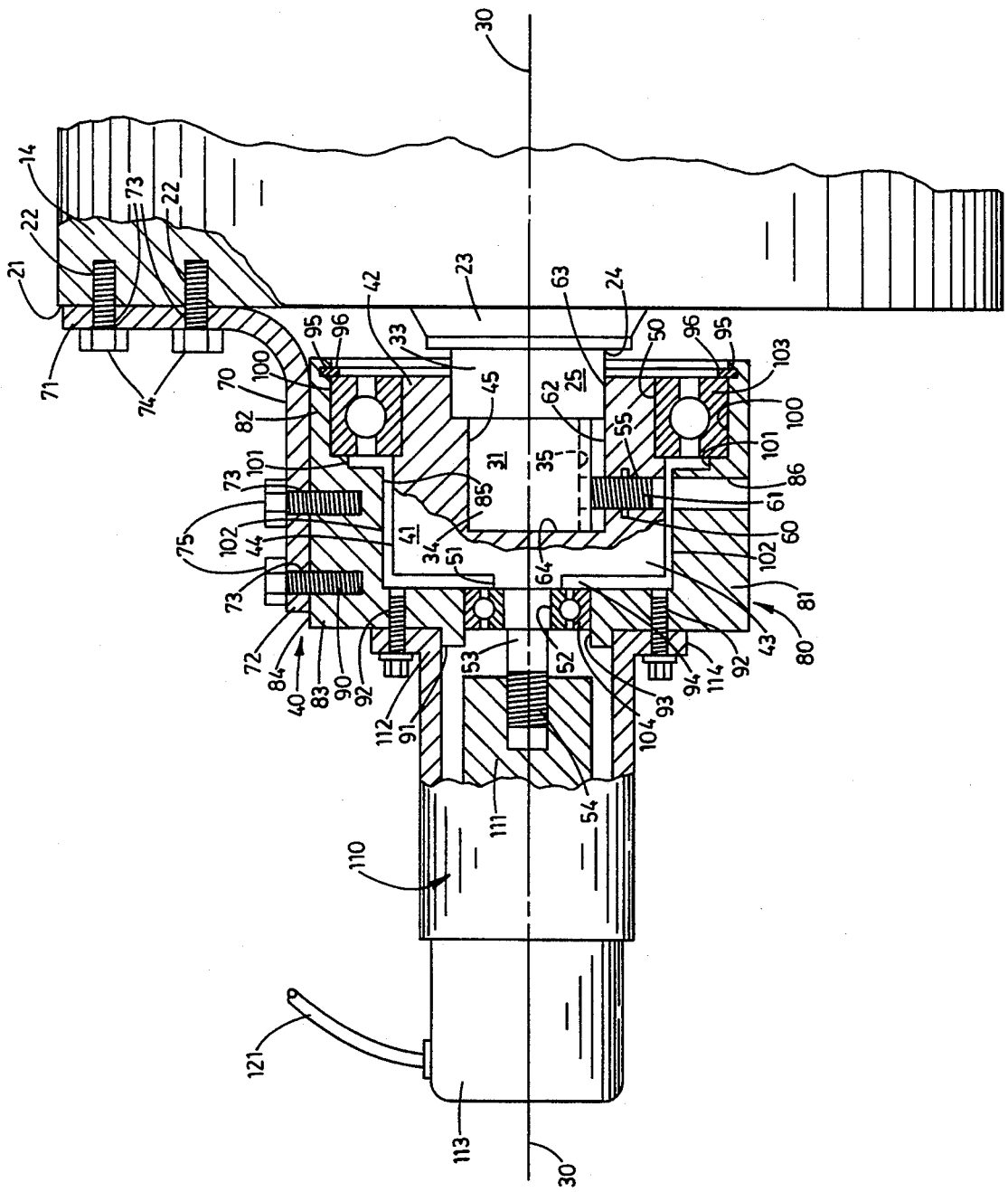
FIG. 2 is a partial, longitudinal vertical sectional view taken from a position along line 2—2 of FIG. 1.

As best seen by reference to FIGS. 2 and 3, a coupler, and which is generally indicated by the numeral 40, has a main body 41 which is substantially cylindrically shaped in cross-section, and which has a first end 42, and an opposite second end 43. As best seen in FIG. 3, the coupler 40 has an exterior facing surface 44 and an opposite interior facing surface 45 (FIG. 2). The main body 41 also has a first reduced outside diametral portion 50 which is located at the first end 42. Further, the main body has a second reduced outside diametral portion 51 which is located at the opposite, second end 43. The main body further has a third reduced outside diametral portion 52 which has a reduced outside diametral dimension in comparison to the second reduced outside diametral portion. A post arm or shaft extension 53 extends substantially longitudinally outwardly relative to the exterior surface 44. The post has a flexible coupling 54 mounted on its distal end. The main body 41 further has a passageway 55 formed therein. The passageway is operable to accommodate a deformable, substantially polymeric based retainer member 60 therein. The passageway 55 receives a suitably dimensioned threaded fastener 61 which is operable to be advanced to predetermined positions along the passageway. As best illustrated in FIG. 2, the inside or interior facing surface 45 defines a channel 62 having a predetermined inside diametral dimension. The channel has a first end 63 and an opposite second end 64. As should be understood, the channel 62 has predetermined inside diametral dimensions to accommodate the outside diametral dimensions of the rotatable shaft 25 which is telescopingly received therein. Therefore, it should be understood that the outside diametral dimension of the main body 41 of the coupler 40 remains substantially constant while the inside diametral dimension which defines the channel 62 is varied to accommodate shafts, and thus motors, of various sizes, and ratings.

As best seen by reference to FIGS. 2 and 3, the apparatus 10 is mounted endwardly of the motor 11 by means of a substantially L-shaped mounting bracket 70.

The mounting bracket 70 has opposite first and second ends 71 and 72. A pair of apertures 73 is formed in each end. Further, a first pair of fasteners and a second pair of fasteners, 74 and 75, respectively, are individually received in each of the pairs of apertures 73 and are operable to secure the housing 80 endwardly of the electric motor 11. As noted above, the coupler 40 is rotatably supported in substantially coaxial alignment relative to the rotatable shaft 25 by means of the housing 80. The housing 80 has a main body 81 which has a first end 82 and opposite second end 83. Further, the main body has an exterior facing surface 84 and an opposite interior facing surface 85. Additionally, the main body has formed therein a passageway 86 which extends from the exterior facing surface to the interior facing surface. The passageway 86 is oriented substantially transversely relative to the longitudinal line of reference 30. As best illustrated by reference to FIG. 3, a pair of threaded apertures 90 are formed in the exterior facing surface 84 of the main body. The pair of threaded apertures 90 are operable to receive the second pair of fasteners 75. Additionally, an aperture 93 having a predetermined diametral dimension is formed in the second end 83 of the main body. The aperture 93 is operable to receive the post 53 which extends therethrough.

The interior facing surface 85 defines a cavity 94 which telescopingly and rotatably receives the main body 41 of the coupler 40. As best seen in FIG. 2, a circumscribing channel 95 is formed in the inside facing surface and is operable to accommodate a snap ring 96. The cavity 94 further includes a first recessed area or bearing seat 100 and a second recessed area which has a reduced inside diametral dimension 101. Additionally, the cavity 94 is defined by a third recessed area 102 having a further reduced inside diametral dimension. As will be recognized the third recessed area has an inside diametral dimension which is greater than the outside diametral dimension of the main body 41 of the coupler 40. As should be understood, the first recessed area receives a first bearing 103; and a second bearing 104 is received in the aperture 93. As will be recognized by a further study of FIG. 2, the first bearing is operable to rotatably support the main body 41 of the coupler, and the second bearing 104 is operable to rotatably support the third reduced diametral portion 52 of the main body thereby rendering the main body 41 of the coupler 40 rotatable about the longitudinal line of reference 30. As should be understood, the passageway 86 is operable, when substantially coaxially aligned with the threaded passageway 55 formed in the coupler 40, to provide a convenient means by which a tool, such as an allen wrench, screw driver, or the like, can engage the threaded fastener 61 thereby threadably advancing it to a position where the fastener is disposed in partially occluding relation relative to the cavity 94. In particular, the threaded fastener 61 is advanced such that it may be received in the keyway 35 thereby rendering the coupler simultaneously rotatable with the shaft 25.

A sensor, and which is generally indicated by the numeral 110, is disposed in substantially coaxial alignment relative to the rotatable shaft 25, and the longitudinal line of reference 30. The sensor is of conventional design and may be an encoder; tachometer; resolver; or similar assembly and wherein these various sensors may be operable to provide data information relative to the rotational speed; direction of rotation; and angular position of the rotatable shaft for any manufacturing requirements. The sensor has a main body 111 with a first end 112, and an opposite second end 113. A base member 114 is fixed on the first end 112 and has formed therein a plurality of apertures 115. As best seen in FIG. 3, a plurality of fasteners 120 are received in the apertures 115 and are threadably advanced into the individual threaded apertures 92 which are formed in the second end 83 of the main body 81 of the housing 80. As best seen in FIG. 2, the post 53 is threadably advanced into force transmitting engagement with the main body 111. As will be appreciated, the coupler is operable to impart rotational movement to the main body of the sensor 110 thereby producing data information which is transmitted from the sensor by means of the electrical conductors 121.

OPERATION

The operation of the described embodiment of the present invention is believed to be readily apparent and is briefly summarized at this point.

Figure 1:
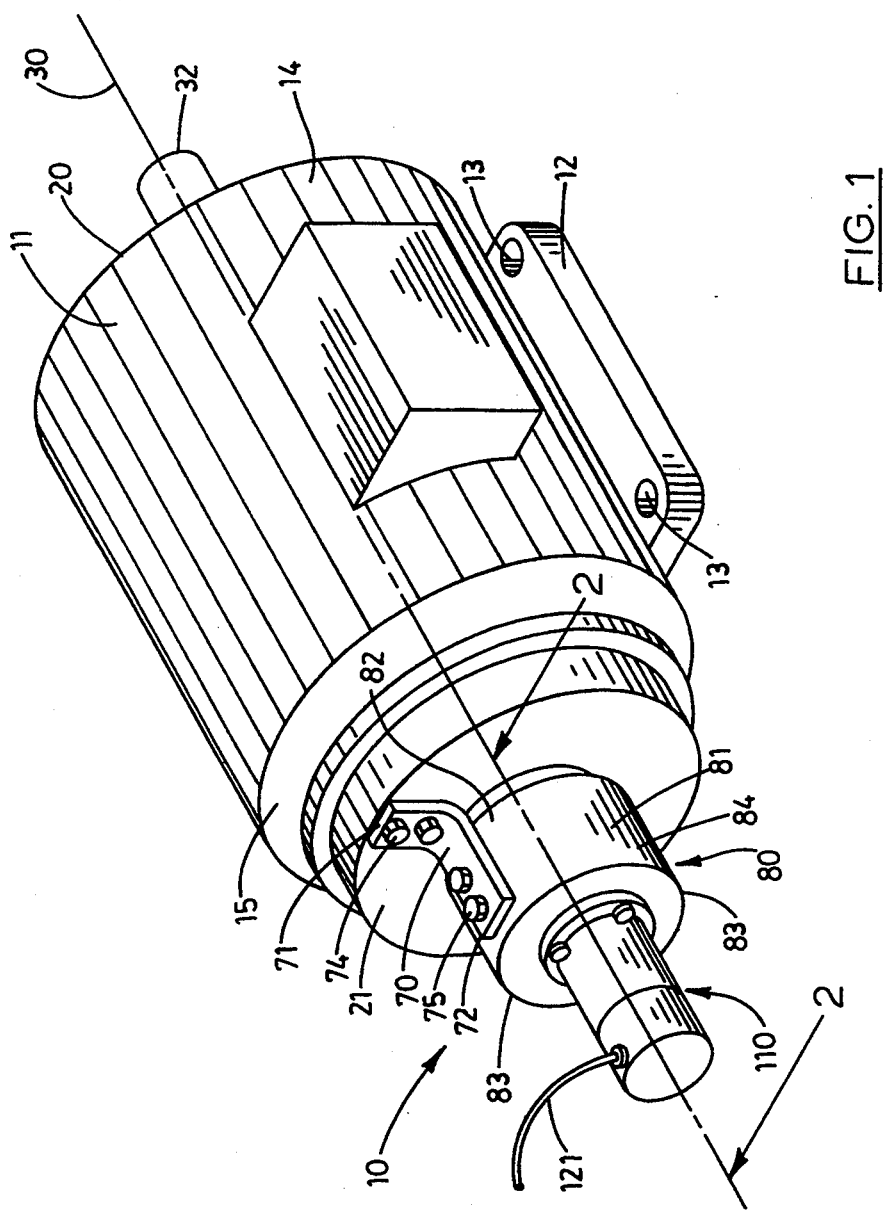
FIG. 1 is a perspective, environmental view of the apparatus of the present invention shown mounted on an electric motor of conventional design.

As best seen by reference to FIG. 1, an apparatus 10 is shown for mounting an object of interest in substantially coaxial alignment relative to a rotatable shaft 25. The apparatus 10 includes a coupler, which is generally indicated by the numeral 40, and which is operable to releasably engage the rotatable shaft. The coupler has an exterior facing surface 44 and a post or arm 53, and wherein the post is substantially coaxially aligned with the rotatable shaft when properly installed on the electric motor 11. The apparatus 10 also includes a housing 80 which is operable to rotatably support the coupler 40 in substantially coaxial alignment relative to the rotatable shaft 25. The housing defines an aperture 93 which receives the post and wherein the post extends outwardly through the aperture. As best seen by reference to FIG. 1, a sensor 110 is borne by the housing and disposed in sensing relation relative to the post. As best illustrated by reference to FIG. 2, the coupler is supported for rotatable movement relative to the housing by means of a pair of bearings indicated by the numerals 103 and 104, respectively. Further, the coupler includes a passageway 55 which accommodates a threaded fastener 61. When the passageway 55 is substantially coaxially aligned relative to the passageway 86, a tool, not shown, may be received in the coaxially aligned passageways thereby forcibly engaging the threaded fastener 61 which may then be threadably advanced into partially occluding relation relative to the channel 62. In particular, the threaded fastener is threadably advanced into mating engagement with the keyway 35 thereby rendering the coupler simultaneously rotatable with the rotatable shaft 25. As best seen by reference to FIG. 2, the post 53 engages the main body 111 of the sensor 110 by means of the flexible coupling 55 thereby permitting the sensor to detect movement of the rotatable shaft. As earlier discussed, the coupler may be designed to provide a cavity 94 which accommodates shafts 25 having varying outside diametral dimensions. Thus the apparatus 10 may be utilized on motors having different sizes or ratings by merely utilizing a coupler which is dimensioned to receive the shaft of the electric motor upon which it is being installed.

Therefore, it will be seen that the present invention has particular utility when employed to position a sensor endwardly of a rotatable shaft, and more particularly, to position a sensor in sensing relation relative to the rotatable shaft of an electric motor or the like. The present invention provides a fully dependable and practical means for appropriately positioning a sensor rapidly and conveniently while reducing to an absolute minimum the possibility of malfunction. Further, the present invention is easily maintained or otherwise accessed for maintenance, modification or the like and is further of sturdy and durable construction and is relatively simple to install or retrofit on existing electric motor assemblies.

Although the invention has been herein shown and described in what is conceived to be the most practical and preferred embodiment it is recognized that departures may be made therefrom within the scope of the invention which is not to be limited to the illustrative details disclosed.

Having described my new invention what I claim as new and desire to secure by Letters Patent of the United States is:

1. An apparatus for mounting an object of interest in substantially coaxial alignment relative to a rotatable shaft, the apparatus comprising:
   a coupler for releasably engaging the rotatable shaft, the coupler having an exterior facing surface, and a post, and wherein the post is substantially coaxially aligned with the rotatable shaft, and wherein the coupler further includes a main body which may be operably coupled to individual shafts which have various diametral dimensions, and wherein the coupler includes an internal facing surface which defines a channel, and wherein the channel has a cross-sectional dimension which is greater than the cross-sectional dimension of the rotatable shaft, and a threaded passageway is formed therein, and wherein a threaded fastener is received in the threaded passageway and is operable to be threadably advanced to a position where it is disposed in partially occluding relation relative to the channel and forcibly engages the rotatable shaft thereby rendering the coupler rotatable therewith;
   a housing for rotatably supporting the coupler in substantially coaxial alignment relative to the rotatable shaft, and wherein the housing defines an aperture which is substantially aligned with the post, and wherein the post extends outwardly through the aperture; and
   a sensor borne by the housing and disposed in sensing relation relative to the post.

2. An apparatus as claimed in claim 1, and wherein the rotatable shaft is made integral with a motor which has an associated motor enclosure for supporting the rotatable shaft, and wherein the apparatus further includes a mounting bracket which is fixed on the motor enclosure and which is further affixed on the housing, the mounting bracket positioning the housing endwardly of the shaft.

3. An apparatus as claimed in claim 2, and wherein the housing defines an internal cavity for receiving the coupler, and wherein the cavity further includes a recessed area, and wherein the apparatus further includes a first bearing which is received in the recessed area and which engages the exterior surface of the coupler thereby rotatably supporting the coupler in the housing.

4. An apparatus as claimed in claim 3, and wherein the apparatus further includes a second bearing, and wherein the second bearing is borne by the housing and is operable to rotatably support the post.

5. An apparatus as claimed in claim 4, and wherein the sensors are operable to detect the speed, position or direction of rotation of the rotatable shaft, and wherein the sensors include resolvers, encoders, tachometers and similar devices which are operable to provide information relative to the performance of the motor.

6. An apparatus for mounting an object of interest, such as a sensor in sensing relation relative to a force transmitting assembly which includes a rotatable shaft, the apparatus comprising:

a coupler for releasably engaging the rotatable shaft, and wherein the coupler has a substantially cylindrically shaped main body, a first end, and an opposite second end, and wherein the main body further has an exterior facing surface, and wherein the exterior facing surface of the main body, at the first end thereof, has a reduced diametral portion, and wherein the coupler has a longitudinal line of reference, and a post is mounted on the exterior facing surface of the main body at the second end thereof, and is disposed in substantially coaxial alignment relative to the longitudinal line of reference, and wherein the coupler further includes a main body which may be operably coupled to individual shafts which have various diametral dimensions, and wherein the coupler includes an internal facing surface which defines a channel, and wherein the channel has a cross-sectional dimension which is greater than the cross-sectional dimension of the rotatable shaft, and a threaded passageway is formed therein, and wherein a threaded fastener is received in the threaded passageway and is operable to be threadably advanced to a position where it is disposed in partially occluding relation relative to the channel and forcibly engages the rotatable shaft thereby rendering the coupler rotatable therewith;

a housing for supporting the coupler in substantially rotatable engagement with the rotatable shaft, and wherein the housing has an exterior facing surface, and an opposite, interior facing surface which defines a cavity, and wherein the cavity is substantially cylindrically shaped and further has a recess having a predetermined diametral dimension, and wherein a passageway is formed in the main body and extends from the exterior facing surface to the cavity, and wherein the housing further includes an aperture which is formed in the cavity and is operable to receive the post;

a first bearing borne by the housing and received in the recess defined by the housing, the first bearing rotatably engaging the reduced diametral portion of the coupler;

a second bearing borne by the housing and received in the aperture which is defined by the housing, the second bearing rotatably supporting the post;

a mounting bracket borne by the housing and fixed on the force transmitting assembly, the mounting bracket securing the housing on the force transmitting assembly; and means borne on the housing for locating the sensor in sensing relation relative to the post, and wherein rotation of the shaft imparts a corresponding rotation to the coupler, and wherein the sensor is operable to detect the movement of the post and provide information regarding same.

7. An apparatus as claimed in claim 6, and wherein the sensor is operable to detect the speed, direction of rotation, or position of the rotatable shaft.

8. An apparatus for mounting an object of interest in substantially coaxial alignment relative to the rotatable shaft of a force transmitting assembly comprising:

a coupler for releasably engaging the rotatable shaft, and wherein the coupler further includes a main body which may be operably coupled to individual shafts which have various diametral dimensions, and wherein the coupler includes an internal facing surface which defines a channel, and wherein the channel has a cross-sectional dimension which is greater than the cross-sectional dimension of the rotatable shaft, and a threaded passageway is formed therein, and wherein a threaded fastener is received in the threaded passageway and is operable to be threadably advanced to a position where it is disposed in partially occluding relation relative to the channel and forcibly engages the rotatable shaft thereby rendering the coupler rotatable therewith;

a housing for supporting the coupler in substantially rotatable engagement with the rotatable shaft;

a mounting bracket borne by the housing and fixed on the force transmitting assembly, the mounting bracket securing the housing on the force transmitting assembly; and means borne on the housing for locating the sensor in sensing relation relative to the post, and wherein rotation of the shaft imparts a corresponding rotation to the coupler, and wherein the sensor is operable to detect the movement of the post and provide information regarding same.

* * * * *